US010536670B2

(12) United States Patent
Chaum

(10) Patent No.: US 10,536,670 B2
(45) Date of Patent: Jan. 14, 2020

(54) VIDEO COPY PREVENTION SYSTEMS WITH INTERACTION AND COMPRESSION

(76) Inventor: David Chaum, Sherman Oaks, CA (US)

( * ) Notice: Subject to any disclaimer, the term of this patent is extended or adjusted under 35 U.S.C. 154(b) by 1784 days.

(21) Appl. No.: 12/597,744

(22) PCT Filed: Apr. 25, 2008

(86) PCT No.: PCT/US2008/005387
§ 371 (c)(1),
(2), (4) Date: Oct. 26, 2009

(87) PCT Pub. No.: WO2008/134014
PCT Pub. Date: Nov. 6, 2008

(65) Prior Publication Data
US 2010/0061553 A1    Mar. 11, 2010

Related U.S. Application Data

(60) Provisional application No. 61/002,569, filed on Nov. 10, 2007, provisional application No. 60/931,946, (Continued)

(51) Int. Cl.
*G06F 21/10* (2013.01)
*H04N 7/173* (2011.01)

(52) U.S. Cl.
CPC .............. *H04N 7/17318* (2013.01)

(58) Field of Classification Search
CPC .............. G06F 3/011; G11B 20/00086; H04N 13/0011; H04N 13/0055; H04N 13/0296;
(Continued)

(56) References Cited

U.S. PATENT DOCUMENTS 4,536,065 A * 8/1985 Sheingorn .............. A61B 3/032
351/239
4,625,290 A * 11/1986 White .................... G09B 9/301
345/419
(Continued)

FOREIGN PATENT DOCUMENTS

| EP | 0 614 308 | 9/1994 |
| EP | 1 259 080 | 11/2002 |
| WO | WO2005/104000 | 11/2005 |

OTHER PUBLICATIONS

Lee et al., "Foveated Video Compression with Optimal Rate Control", IEEE Transactions on Image Processing, vol. 10, No. 7, Published Jul. 2001. (Year: 2001).*
(Continued)

*Primary Examiner* — Chau Le
(74) *Attorney, Agent, or Firm* — Clark & Brody

(57) ABSTRACT

Disclosed are systems and methods for providing video content while inhibiting the copying of that content for later viewing. Video images may be made difficult to copy for presentation at later times by the omission or addition of content developed in relation to the particular initial viewing. For instance, video information may be customized by omitting information that is not likely to be substantially perceived by the initial viewer but that is substantially likely to be perceived as missing by at least some other viewers. As another example, video information may be customized for a particular viewing instance so that it contains modified, selected or injected information that is likely to be perceived as non-disruptive or unnoticeable by the original viewer but that would be perceived as substantially noticeable and/or disruptive by some other viewers, including when parts of more than one such video information are combined in an effort to remove customization related to their respective original viewings. Various means and methods for accom-
(Continued)

plishing the forgoing in a variety of settings are disclosed including also for providing privacy related to what is viewed. In some examples higher-resolution images are provided for the region near the viewer's point-of-regard and lower resolution images are provided elsewhere, which also has the effect of reducing the bandwidth required. For interactive content rendered from digital models, a model for a central foveal region may be provide greater detail and have greater computational requirements than a model for a peripheral view, providing both economy/performance in rendering and protection against copying.

8 Claims, 10 Drawing Sheets

Related U.S. Application Data filed on May 25, 2007, provisional application No. 60/928,004, filed on May 7, 2007, provisional application No. 60/927,261, filed on May 1, 2007, provisional application No. 60/926,373, filed on Apr. 25, 2007, provisional application No. 60/993,789, filed on Sep. 14, 2007.

(58) Field of Classification Search
CPC ....... H04N 21/25891; H04N 21/47205; H04N 21/854; H04N 19/51
USPC .......................................................... 358/446
See application file for complete search history.

(56) References Cited

U.S. PATENT DOCUMENTS

| | | | | | |
|---|---|---|---|---|---|
| 5,038,224 | A * | 8/1991 | Martulli | ............. | H04N 1/00795 250/201.1 |
| 5,737,012 | A * | 4/1998 | Tabata | ................ | G02B 27/017 345/8 |
| 6,028,608 | A * | 2/2000 | Jenkins | ................ | G06T 1/0021 345/619 |
| 6,072,934 | A * | 6/2000 | Abecassis | ............... | A63F 13/10 348/E5.102 |
| 6,115,513 | A * | 9/2000 | Miyazaki | ............. | G06F 3/0426 382/181 |
| 6,144,743 | A * | 11/2000 | Yamada | ............... | G06Q 20/206 380/42 |
| 6,252,989 | B1 * | 6/2001 | Geisler | ................ | H04N 19/176 345/555 |
| 6,289,165 | B1 * | 9/2001 | Abecassis | ............. | G11B 19/02 348/E5.105 |
| 6,351,335 | B1 * | 2/2002 | Perlin | .................... | G02B 13/00 345/1.1 |
| 6,474,817 | B1 * | 11/2002 | McKinnon | ............ | A61B 3/024 351/243 |
| 6,646,655 | B1 * | 11/2003 | Brandt | .................... | H04N 5/06 348/E5.011 |
| 6,697,383 | B1 * | 2/2004 | Li | ........................ | H04L 7/042 370/472 |
| 6,842,122 | B1 * | 1/2005 | Langner | ............... | G01C 23/005 340/945 |
| 8,890,773 | B1 * | 11/2014 | Pederson | ............... | H04B 1/385 345/8 |
| 2002/0054397 | A1 * | 5/2002 | Matsushima | ..... | G06F 17/30893 358/524 |
| 2003/0016827 | A1 * | 1/2003 | Asano | ............... | G11B 20/00086 380/277 |
| 2003/0067476 | A1 * | 4/2003 | Miller | ..................... | G06F 3/011 345/598 |
| 2003/0086061 | A1 * | 5/2003 | Pfleger | ................. | A61B 3/0058 351/209 |
| 2003/0194142 | A1 * | 10/2003 | Kortum | ............... | H04N 19/162 382/239 |
| 2004/0030898 | A1 * | 2/2004 | Tsuria | ..................... | G06F 21/10 713/171 |
| 2004/0114709 | A1 * | 6/2004 | Griffith | ................... | A61B 6/032 378/4 |
| 2004/0133794 | A1 * | 7/2004 | Kocher | ............ | G11B 20/00086 713/193 |
| 2004/0145679 | A1 * | 7/2004 | Kim | ................... | G06F 17/30902 348/398.1 |
| 2004/0179740 | A1 * | 9/2004 | Yasuhiro, II | ............ | G06T 11/60 382/232 |
| 2004/0227699 | A1 * | 11/2004 | Mitchell | ................ | A61B 3/113 345/44 |
| 2005/0018911 | A1 * | 1/2005 | Deever | ................ | H04N 19/597 382/232 |
| 2005/0041100 | A1 * | 2/2005 | Maguire, Jr. | ........... | G06F 3/011 348/121 |
| 2005/0195277 | A1 * | 9/2005 | Yamasaki | ............ | G02B 27/017 348/61 |
| 2005/0264702 | A1 * | 12/2005 | Yoshii | .................. | G09G 3/3406 348/687 |
| 2006/0176951 | A1 * | 8/2006 | Berman | ............. | H04N 21/4223 375/240.01 |
| 2006/0271612 | A1 * | 11/2006 | Ritter | ................. | G02B 27/0093 708/203 |
| 2007/0002130 | A1 * | 1/2007 | Hartkop | ................. | H04N 7/141 348/14.16 |
| 2007/0169158 | A1 * | 7/2007 | Folgner | ............. | G06F 17/30017 725/90 |
| 2008/0002830 | A1 * | 1/2008 | Cherkasov | ........ | G06F 17/30011 380/277 |
| 2008/0016245 | A1 * | 1/2008 | Cunningham | ...... | G06F 3/04817 709/246 |
| 2008/0114995 | A1 * | 5/2008 | Jogand-Coulomb | ........................ H04L 9/0894 713/193 |
| 2010/0110368 | A1 * | 5/2010 | Chaum | ................ | G02B 27/017 351/158 |
| 2010/0118963 | A1 * | 5/2010 | Nakagami | ................ | G06T 3/40 375/240.16 |
| 2010/0174652 | A1 * | 7/2010 | Shear | ................ | H04L 12/40117 705/53 |
| 2011/0214044 | A1 * | 9/2011 | Davis | ..................... | G06T 11/00 715/201 |

OTHER PUBLICATIONS

International Search Report dated Nov. 18, 2008 for International Application PCT/US2008/005387, 4 sheets.

* cited by examiner

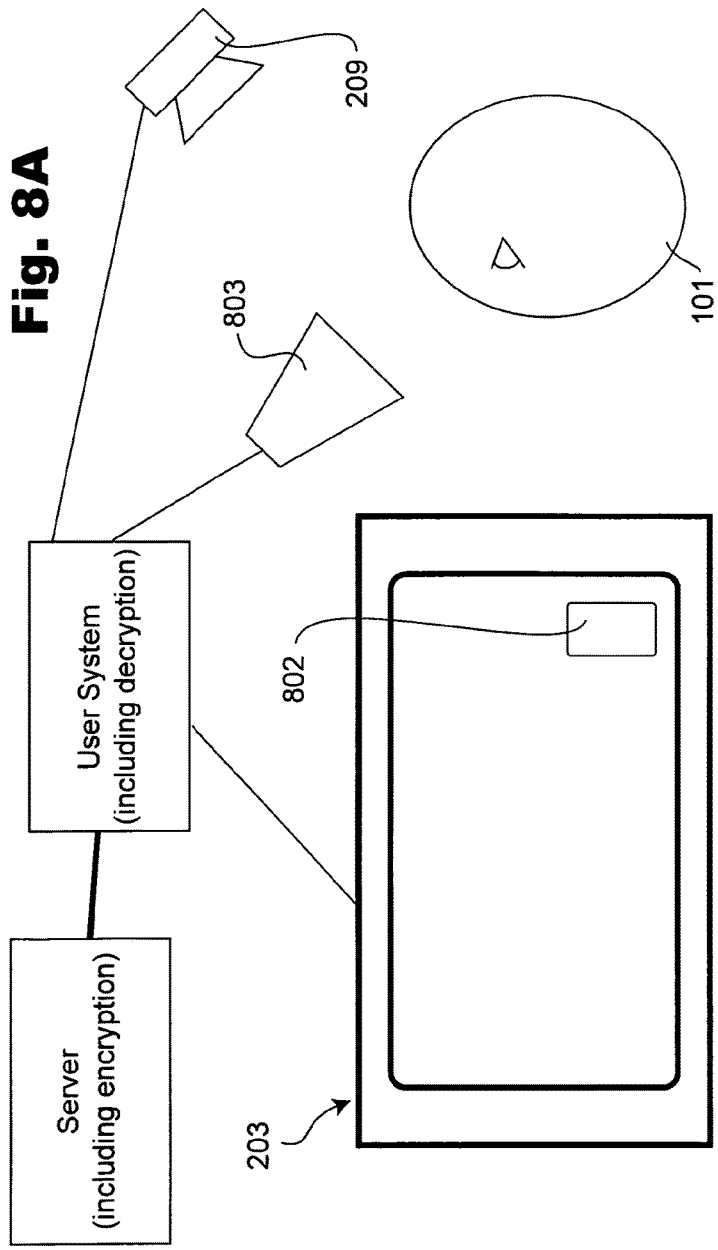
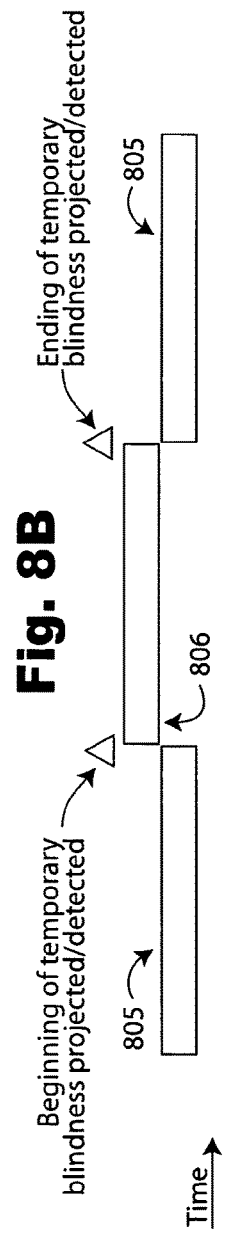

VIDEO COPY PREVENTION SYSTEMS WITH INTERACTION AND COMPRESSION

CROSS-REFERENCE TO RELATED APPLICATION

This application is a National Phase Application and claims the priority of International Application Number PCT/US2008/005387, filed on Apr. 25, 2008, which claims the priority of United States Patent Application Nos. 60/926,373, filed on Apr. 25, 2007, 60/927,261 filed on May 1, 2007, 60/928,004 filed on May 7, 2007, 60/931,946 filed on May 25, 20087, 60/993,789 filed on Aug. 14, 2007 and 61/002,569 filed on Nov. 10, 2007

BACKGROUND OF THE INVENTION

1. Field of the Invention

The present invention is directed at video systems and copy prevention generally, and more specifically at systems for increased efficiency and protection against copying of video content.

2. Description of Prior Art

The present application claims priority from the following United States Provisional Applications, by the present applicant, that are hereby included by reference in their entirety:

U.S. 60/926,373 titled "Video Presentation and Copy Prevention Systems," filed Apr. 25, 2007;

U.S. 60/927,261 titled "Video and Gaming Enhancement and Copy Prevention Systems, filed May 1, 2007;

U.S. 60/928,004 titled "Video and Interaction Enhancement and Copy Prevention Systems," filed May 7, 2007;

U.S. 60/931,946 titled "Video Copy Prevention Systems with Interaction and Compression," filed May 25, 2007;

U.S. 60/993,789 titled "Video Copy Prevention Systems with Interaction and Compression," filed Sep. 14, 2007; and U.S. 61/002,569 titled "Video Copy Prevention Systems with Interaction and Compression," filed Nov. 10, 2007.

Substantial protection against copying of the content underlying the viewing experience is believed generally appreciated as of major commercial advantage and concern. Yet for such things as motion pictures and video games the systems currently offered have significant shortcomings. For instance, the security of various so-called "DRM" (Digital Rights Management) systems is frequently reported to be compromised. The present application includes among its objects practical systems for improving such protection. Furthermore, DRM systems have often required equipment that is inconvenient to and disliked by viewers because it protects its own structure and secrets against access by viewers. Some DRM systems are also intrusive of viewer privacy. The present application includes among its objects practical systems that inhibit useful copying while allowing viewers full access to their own equipment and protection of privacy.

Motion pictures are known to rely on the fact that rapid switching between static images creates the illusion of continuous motion; the present work is based in part on the known fact that rendering the viewer's points of regard in high-resolution creates the illusion of overall high-resolution. So-called "eye-tracking" and "foveated displays" are known that can realize the illusion of high-resolution. In some aspects, substantially limited eye tracking resolution and displays of fixed resolution are believed adequate to realize some of the copy prevention objectives. In other aspects, interactive video can be rendered more efficiently when higher-resolution is needed only in a foveated portion. In other aspects protection is provided or enhanced by means other than eye tracking.

Prior art for so-called "eye tracking," "gaze contingent," and "foveated" displays is known. For instance, the book "Eye Tracking Methodology: Theory and Practice" by A. T. Duchowski, is included herein by reference. Some such systems have been developed to reduce transmission and display bandwidth, such as by U.S. Pat. No. 6,252,989 Geisler, et al.; U.S. Pat. No. 7,075,553 US Patent application 20060176951, Berman et al.; U.S. Pat. No. 6,959,450, Ritter et al, and the references of and to it, all of which are hereby included herein. Other foveated display/viewing art is exemplified by U.S. Pat. No. 6,985,158, Miller et al., U.S. Pat. No. 6,351,335, Perlin, and the references of and to these, all of which are hereby included herein.

The present invention aims, accordingly and among other things, to provide novel and improved video and related systems. Efficiency, viewing quality, copy-resistance, portability, and flexibility in distribution in such systems are important goals generally. Objects of the invention also include addressing all of the above mentioned as well as providing practical, robust, efficient, low-cost methods and systems. All manner of apparatus and methods to achieve any and all of the forgoing are also included among the objects of the present invention.

Other objects, features, and advantages of the present invention will be appreciated when the present description and appended claims are read in conjunction with the drawing figurers.

BRIEF DESCRIPTION OF THE DRAWING FIGURES

FIG. 8 is a combination block, system, schematic, plan, flow and timeline diagram for a single user and server system with display for an exemplary temporary blindness aspect embodiment in accordance with the teachings of the present invention.

BRIEF SUMMARY OF THE INVENTION

Figure 1:
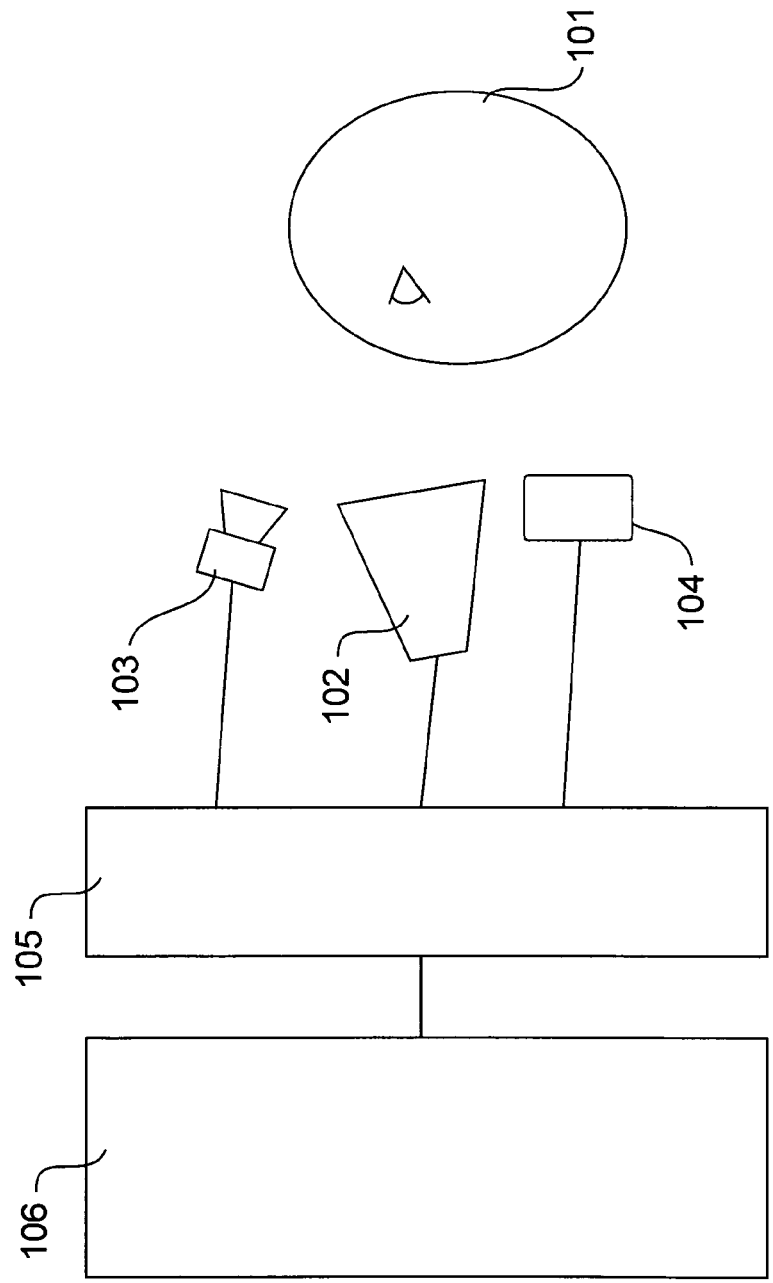
FIG. 1 is an overall block diagram for a single-user system is shown for exemplary embodiments in accordance with the teachings of the present invention.

This section introduces some of the inventive concepts, in a way that will readily be appreciated through making significant simplifications and omissions for clarity and should not be taken to limit their scope in any way; the next section presents a more general view.

Video images may be made difficult to copy for presentation at later times or to other persons by the omission or addition of content developed in relation to the particular initial viewing instance. For instance, video information may be customized by omitting information that is not likely to be substantially perceived by the viewer of the initial instance but that is substantially likely to be perceived as missing by at least some other viewers. As another example, video information may be customized by for a particular viewing instance so that it contains modified, selected or injected information that is likely to be perceived as non-disruptive or unnoticeable by the viewer in the particular instance but that would be perceived as substantially noticeable and/or disruptive by some other viewers, including when parts of more than one such video information are combined in an effort to remove customization related to their respective original viewing instances.

As just one example for concreteness, a first viewer is provided with a video that shows the regions that viewer is fixates on in high resolution and the regions that user does not fixate on in lower resolution. A second viewer is provided with a rendering of substantially the same video content with the regions that viewer fixates on in high resolution and the rest in low resolution. If this process were to be repeated enough times, all regions of the video might eventually be disclosed in high resolution. These could then be stitched together by viewers or those accessing the viewing system to form a complete high-resolution copy of the video, which might be undesirable from the perspective of the creator of the video. One example solution to this would be to prevent so many viewings by any one group of viewers. Another example would be to change some or all of the videos so that, while they are self-consistent, they are each different enough that simply combining them would produce a noticeable and undesirable version and that trying to remove the differences may be substantially difficult. Each instance of the vide might, for example, be rendered from a different perspective or with a different color scheme. In some examples higher-resolution images are provided for the region near the viewer's point-of-regard and lower resolution images are provided elsewhere, which also has the effect of reducing the bandwidth required. For interactive content rendered from digital models, a model for a foveal region may be provide greater detail and have greater computational requirements than a model for a peripheral view, providing both economy in rendering and protection against copying.

General Description

This section introduces some of the inventive concepts related to the spirit of the present invention so that they may be more readily appreciated, but makes simplifications and omissions for clarity and should not be taken to limit the scope of the invention in any way. Video without user interaction is considered first, then video with user interaction.

Known is coding of data provided for viewing that includes higher-resolution for what will be called a "foveal" regions portions and substantially lower-resolution for other what will be called "peripheral" regions or portions or backgrounds of a video image. Eye tracking is used in some examples so that foveal data is rendered as light directed at and incident on the foveal region of at least one viewer retina.

In one inventive aspect, restricting access to limited instances of such foveal data is believed generally to inhibit the making of copies comparable in terms of experience offered to an original viewing that includes the particular foveal regions as they are visited by the fixations of the particular viewer. It is believed that so restricting makes it difficult for persons with only a limited collection of such instances to make copies that are substantially better than in effect the lower-resolution peripheral image, at least in many portions of the overall image, and that in many circumstances such copies would consequently appear to be illicit copies or otherwise less desirable. For example, a second viewer attempting to view a copy of the video data shown to a first viewer is believed to at least potentially have different and/or differently-timed so-called "saccade" rapid eye movements and related foveal "points of regard" or "fixations" that will usually line up neither spatially nor temporally with those of the copy; differing foveal inset detail when the point of regard differs will it is believed readily be noticeable and degrade at least the perceived quality of the copy and omitting the detail it is believed will yield substantially the background peripheral resolution.

In some inventive examples, a remote server provides control to limit the number of different viewing instances that would be available to those seeking to create illicit copies, such as by limiting the count of instances served and/or is related to the extent of coverage afforded by the data provided in such instances served. In some examples, the set or sets of recipients of the data having substantially complete data is tracked and/or controlled. In some such systems different recipients of data are modeled differently by analysis and decision systems, such as by level of trustworthiness and/or likely collusion with particular other recipients. Thus such systems for restrictive distribution can limit exposure to various threats statically or adaptively and also develop information related to the details or extent of the threats.

Other types of limitation of data beyond two regions with differing resolution are anticipated. Restrictions on data in some examples conform more particularly to distribution of intensity sensing and color sensing rods and cones of the retina (including the dark spot), and the temporal/integrative character of these sensing structures, for particular viewers and/or viewers more generally. Such a potentially more generally limited image pattern, whether dynamic or static, will be referred to here as at least a type of "foveal inset."

In another aspect, the overall view data provided to viewers for a scene is preferably what will be called here "diversified" so that different instances of the video will have different insets corresponding to what would be the same or related inset location in the original video. Some examples of kinds of such diversification include perspective, cropping, projection, alignment, color, temporal, focus distance, depth of field, and the blind spot where the optic nerve is located. These various types of diversification of an inset will be taken for clarity here to be characterized by "parameters" of the diversification. Each such example aspect listed above may accordingly be characterized by one or more such parameters and a particular assignment of values to such parameters would preferably substantially determine an inset.

Diversification parameters, at least in some examples, are adaptively selected to impede a user or collections of users from piecing together foveal insets to form a substantially acceptable higher-resolution video or foveal region creation capability, such as one of substantially higher overall resolution than the peripheral regions of the original. For example, if a single user views a video repeatedly, then the parameters for a particular scene would preferably differ per viewing, so as to impede compositing the insets together by that user to produce a high-quality video. (A viewer watching the same scenes over and over and exhibiting similar fixations, however, is optionally provided the same diversification, limiting the flow of information to that user.) As another example, the same diversification parameter configurations are optionally distributed among multiple users for economy. But the pattern of users preferably is such as to require substantial, such as geographically dispersed and not apparently coordinated, collusion to recover substantially coherent collections of data. Such distributions are also preferably varied per aggregation, such as video scene or the like, to make a complete performance even more difficult for a collusion to composite.

In theater settings, as yet another example, viewers are preferably synchronized temporally per performance while other parameters are diversified across the audience; while across performances even temporal aspects such as speed of play and cuts are optionally diversified. Peripheral images in some examples are shared among substantially local viewers with synchronized timing. However, some diversification changes the peripheral image as well as the insets. This is optionally achieved by local processing according to parameters supplied to it, such as for performance reasons, even though it may mean high-resolution copies are not quite as difficult to make; however, re-rendering sufficient insets, assuming they can be obtained, to make the parameters consistent for a scene with any peripheral image is believed substantially difficult and/or costly in some cases even if the differences in peripheral image parameters are known. The peripheral images preferably contain limited resolution, allowing some lack of precision in their description, and they do not necessarily perceptibly include all parameters, such as for instance stereo.

The "points of interest," such as likely fixation points in a video sequence, have a representation in the peripheral rendering. It is believed that research publications such as "Visual memory for natural scenes: Evidence from change detection and visual search," by Andrew Hollingworth, in Visual Cognition, 2006, 14:4, pp. 781-807, suggest that if the peripheral representation of a point of regard differs enough from the corresponding high-resolution inset rendered during fixation, a significant probability exists that the viewer will notice. Accordingly, and to the extent true, the points of interest in a scene's peripheral view are preferably rendered to correspond with substantially different insets per diversification and even to change such distribution of insets per inter-saccade interval until the point of interest becomes a point of regard. This preferably ensures that each actual fixation is provided with an inset that matches at least its previous corresponding peripheral rendering. It is also believed that each fixation inset detail should remain substantially unchanged for a particular viewer. Thus, since a viewer sees a matching fixation inset and always a repeated inset, no errors are detected during proper use by the viewer.

An adversary attempting to amass a complete set of insets per likely or substantially all fixation points, however, is believed to be at a disadvantage. One example reason is that the peripheral views will substantially differ from whatever minimized set of fixation insets is selected for use by the adversary and the fixation peripheral renderings will need to be corrected (and even with diversification) in order to avoid viewers of the composite stream sensing mismatch between the fixation destination peripheral and inset views.

It will be appreciated that there are believed potential practical limits to the protection that can be achieved by such systems generally without user interaction. For instance in some sense any viewer can typically gain enough information to create anew a substantially technically-separate but conceptual "knock off" of a video. A very sophisticated copying effort may attempt to create a model, such a 3D animation model, and it may be able to integrate each additional piece of data, particularly if the parameters of the data can be parsed and this may even be with human assistance. In view of these considerations, the present invention is directed, at least in some aspects, at increasing the difficulty of obtaining fragments that are more readily combined. (In an interactive system, however, various logic and underlying models are preferably held back from direct capture.)

In a related aspect, techniques are disclosed for influencing viewer behavior in a way aimed at enhanced protection by affecting the distribution and diversity of foveal insets. As an example, it is known that a significant change in image at a point in the peripheral region may attract a saccade to that point, but removing the change substantially before the fixation has settled on it can keep the stimulus from being perceived by the viewer. Such techniques are anticipated as a way to cause a greater diversity of fixation points than might occur naturally and/or to help detect or impede efforts to pump common or sought-after foveal insets out of the system. They are optionally also used to direct the gaze at points for which inset data is readily available locally to improve speed of response. (In some interactive systems, to be described, it is believed that such techniques can reduce the duration of fixations, which can be advantageous where models allowing change responsive to users inputs are provided, because the longevity of the models and what they disclose is reduced.)

In yet another aspect, latency generally between point of regard prediction or determination and availability for display of foveal insets is a known issue, potentially more so when saccade and hence tolerable latency are shorter, and depending on network and other subsystem performance. Accordingly, various pre-fetching of images is anticipated as is sending data more than one time and in more than one way and in various potentially at least partly redundant parts that can be combined to recover particular images needed. However, so as to limit disclosure of data, encryption of separate parts of the data under separate keys is preferably used. Since the keys are substantially smaller than the data, they are believed more rapidly sent and are potentially sent with greater redundancy in sending with less transmission and quality of service cost compared to the encrypted pre-fetch data. Thus, latency is reduced by sending encrypted data substantially in advance and as the need is anticipated and then preferably rapidly revealing the keys needed to access the data only when the probability that it will be needed is high enough.

In a further aspect, substantial tamper indicating or tamper resistance, difficult-to-reverse-engineer or tamper-responsive devices and the like are well known in the area of protecting digital content and will generally be referred to here as "protected" devices. Although the present systems aim at least in part to avoid the need to rely on such an approach exclusively in many applications, it is anticipated that such an approach can be included to provide additional advantage in some applications and may be relied on in others. In one example a protected device is entrusted with some further fixation insets/keys than are provided to a less trusted user device/system. Examples of such second tier data include so-called "parafoveal" or "macular" regions and/or anticipated or short saccade distance points of regard. In another example, a protected device may be provided to a semi-trusted entity and then recovered or inspected and it may be adapted to erase its keys before power down and if it does not hear from a central device sufficiently while powered up.

In an aspect related to latency and protected devices, a network of devices, whether and to what extent protected, cooperates in the supply of image data to a viewer device. For instance, peers of a viewing device, being other such devices substantially local to the particular viewer, are provided inset images for low-latency access. Such devices coordinate among themselves preemptively and/or after the fact, and communicate with one or more servers, in order to prevent the leaking of too much to the viewer device and/or to detect such leaking or attempts to get more data than a single viewer would be expected to need. Protected devices are anticipated to cooperate in such ways as well. Moreover, adaptive systems analyzing risks can monitor, attempt to influence, and control the access to insets of such collaboration structures.

In another aspect related to latency, local or substantially local copies of data in encrypted form are anticipated. In some examples such data is in the form of a portable data carrier medium, such as a disc or solid-state device; in other examples, it is in the form of a local "server" like device that stores the content and serves it up to one or more entities. In such cases, the data stored is preferably encrypted under separate keys per aspect that would be released to the viewer, such as per inset image and/or background image and/or key frame and/or difference frames. The keys are supplied preferably online from a trusted server, such as operated by the content provider. For so-called "in flight entertainment," portable players or built-in players are known. Other settings where multiple viewers can be provided with keys from a local server are anticipated, such as theaters, events or exhibitions. In such settings, where viewing devices have protected structure, they preferably retain keys in a volatile and/or actively-erased memory and only while in communication with the server.

So-called video games are known to be a major market and are impacted by perceived resolution of images displayed as well as by so-called "piracy" concerns. To the extent that a video game experience includes segments where the player is substantially passive, those aspects already described for videos are readily applied. But for those instances when the player provides input to the game through so-called "controls," substantially rapid responses by the display is believed desired in many instances.

So-called smooth pursuit movements of the eyes are known and generally believed to be substantially slower than saccades and are often used to track moving objects/images. In some exemplary embodiments such slowly-moving images are allowed and insets are extended to accommodate them. In other examples, slow motion of images that are likely points of regard are omitted from content and/or when the eye is seen to be moving slowly stimulation is provided to induce saccade away.

In one inventive aspect, a so-called model is downloaded to the game device for the background image and a second model for a particular inset. Such models, for instance, are programmatically and/or parametrically and/or by including one or more images/textures, provide a way for the gaming device to compute and render the respective regions responsive to the passage of time and/or control inputs by players. Such models are modified and/or replaced, responsive to the passage of time and/or control inputs by the players, by one or more protected or remote devices such as servers. In another inventive aspect, multiple alternate images are provided to the gaming station and which image should be displayed responsive to which control inputs is also provided or implicit. Thus, by refreshing the peripheral and/or the inset image sets frequently enough so that substantially timely images are available for rendering, substantial local modeling is obviated. Various combinations of these aspects are anticipated, depending on the setting. For instance, an enduring peripheral model combined with inset image assortments can provide rapid and smooth response generally and limit the amount of data to be downloaded and the detail of the models disclosed to the gaming device. As another example, games can take advantage of knowing the points of regard, such as by the feedback they give players, for instance that a virtual being in the game may appear to be cognizant of the point of regard, such as by looking where the player is looking, staring back, or explicitly mentioning or relating to the player's gaze. Furthermore, players can be encouraged to keep moving the point of gaze, such as a defensive measure, by corresponding rewards for continual scanning or penalties for lingering gaze.

In a another inventive aspect, privacy of viewers is of course a very significant concern in many settings. One approach to enhancing privacy is by using such protected devices to act at least in part locally in the interest of the user. For instance, such a device hides exactly which of several points of regard relate to a particular user session and even which of several videos are viewed. Another and potentially complementary approach relates to so-called "private information retrieval" techniques. For instance, viewer equipment and/or protected equipment hides the particular foveal inset it requests from among a set of potential such insets.

In still a further inventive aspect, the so-called "vergence" angle between the eyes is generally known to vary with the distance focused on. The three-dimensional effect in viewing is believed enhanced and/or an additional parameter to differentiate insets is provided by varying the sharpness/blur associated with distance differences in a 3D model. Thus, generally, in the embodiments contemplated herein, the ability to measure vergence and adjust focus accordingly is preferably included to enhance the perception of a realistic three dimensional experience. Moreover, the vergence of a user/viewer can be regarded generally as further input akin to point of regard and blink intervals that can help make each instance rendered different from others to increase the difficulty of combining them to circumvent copy protection. So-called depth of field is also a parameter potentially varied, to enhance/diminish the effect and/or to provide an additional parameter for diversifying insets.

Imaging of patterns whose overall reflectance differs recognizably when aligned correctly with the retina, such as patterns that are in effect a photograph of the retina, can be used to develop and ensure high-accuracy of registration between the modeled retina and the retina reflecting the light. Of course there is privacy related information in such a technique, though it need never leave the local alignment feedback loop. In another example, it can be used to limit viewing to certain users with only local protected structures. Such a retina image capability can of course also be used for identification of viewers. Such identification data is preferably kept locally, or by protected structures as mentioned that at least in part protect user interests.

One exemplary configuration is a display of conventional resolution coupled with an eye tracker, such as are commercially available. A protected or remote mechanism provides the inset; the peripheral image is stored locally. As an example, a three-dimensional animation is rendered with substantially different point-of-view for each scene and showing.

Another exemplary configuration is where each viewer is provided with so-called "virtual-reality goggles" that include eye tracker and preferably do not prevent viewing the surroundings. Viewers are able to participate socially, as the timing of the video or the multi-player game is the same, but each is able to view the other local participants as well.

In some inventive aspects, "temporary blindness" of a viewer is detected and exploited to inhibit use of copied content. For example, it is believed that when a viewer blinks, the viewer sees substantially little of the image presented. Such blinking is believed detectable, such as by camera and/or change in IR retroreflection of the eye. In some instances, the viewer holds the eyes closed for a longer period than a blink, such as voluntarily or dozing off. Another example of temporary blindness resulting from the viewers physical motion is that which is generally regarded to occur during the interval of a saccade, which are described including detection of the same elsewhere here. Detecting saccades is believed to require substantially less costly and/or cumbersome hardware and/or software than substantially accurately determining the point of gaze/regard and/or the direction of a saccade. In still other examples, the viewer may look away from the screen or defocus. Detecting such off-image gaze is believed also more readily accomplished than accurate fixation point tracking, particularly when the degree of off-image or threshold for gaze to be considered off-image for such purposes is substantially large. Measures that take advantage of at least some temporary blindness intervals are an aspect of such systems that can be combined with other aspects described elsewhere here.

Detecting a temporary blindness and providing images (or the lack thereof) responsive to such detected intervals can to some extent inhibit use of a copy of the viewing experience. In one example, an essentially blank and/or gray level of comparable average intensity or spectral distribution to the preceding image is provided at least for a portion of the interval. It is believed preferable that the intensity of such a blank, or in some example optional configurations very-low resolution image, morphs or changes gradually to the average level present at the end of the interval in the actual image. This is believed to provide advantages including, for instance, a less disruptive light level that may be seen by others in the vicinity and/or to provide lack of alarm to the viewer that may be perceived because the temporary blindness is not absolute.

In other examples, the type of image provided during a temporary blindness is intended to alert a viewer of a copy that what is being viewed is such a copy and/or to inconvenience or distract such a viewer in such case. In one exemplary embodiment what will be called a "recognizable indication," such as for instance a message in text, icon, symbol, or other symbolic form is inserted into the image during the blindness interval. One example of such a recognizable indication is a text message, such as for instance "this is an unauthorized copy," "this copy was provided to John Jones," or "report the source of this illegal copy for a reward to www.reportacopy.org." Another example of such an indication is as a substantially distinctive or recognizable symbol, color, visual pattern, motion pattern, logo, or whatever brand identifier or the like associated with improperly-made copies. Further example indications include images that are inappropriate, disruptive, or even disturbing to potential viewers of an illicit copy. Instead of or in addition to the above mentioned examples being applied to substantially an overall image, anticipated is an indication by a change that serves to draw attention and regard by the viewer to a particular region or area with one or more of the example changes substantially located or highlighted in that area. It will be appreciated that a simple standard image inserted during a blind interval is more readily recognized automatically and edited or changed than images chosen from a larger repertoire, blended in with the original video, or even provided as a kind of distortion of the original video. Making it substantially difficult or costly to reliably detect and remove such segments automatically is a potential goal. Generally, all manner of degradation and/or false or annoying images are anticipated as potentially included during such intervals.

Various other examples are anticipated. For instance, the images are altered during temporary blindness to include changes to the content that are substantially difficult to detect automatically to provide a kind of watermarking function that can be seen if looked for. Another example, for instance, is that the temporary blindness interval is used to download additional data to improve performance and/or to be used to fill other such intervals. In still another example, for instance, the point at which a scene cuts or the rate of change of a pan or zoom or the like is varied during the interval from what it would have been otherwise.

It is anticipated that someone wishing to make a copy of a video stream may arrange to have two or more different streams with different blink and saccade timings so that, by simply splicing them, a complete stream can be obtained without any indication intervals. Without knowing the blinking and saccade timings, which might be calculated by a substantially tamper resistant device for instance, the maker of an illicit copy would have to detect such intervals and hidden aspects of them as mentioned. Even when such intervals are identified, in whatever way, however, by combining some other exemplary aspects mentioned elsewhere here, the viewing intervals from the different streams may, at least with some substantial probability, be incompatible with each other. Examples, as will be appreciated, include when the viewing intervals of the different streams are provided with different camera angles, zoom, color balance, peripheral points of interest, etc. they will produce a poor quality stream when inter-cut. A server optionally also may look at the blink and/or saccade timing reported and determine if it is credible and/or what combinations of streams to provide. These are particularly suited to settings such as where there is a viewer per rendering.

DETAILED DESCRIPTION OF PREFERRED EMBODIMENTS

Detailed descriptions are presented here sufficient to allow those of skill in the art to use the exemplary preferred embodiments of the inventive concepts.

Turning now to FIG. 1, an overall block diagram for a single-user system is shown for exemplary embodiments in accordance with the teachings of the present invention. What may variously be called a user, viewer or person 101 is shown in cooperation with the rest of the system. Video images or the like are made visible to the user by image means 102, such as by screens, projectors, heads-up display, projection onto the retina, direct connection to the brain, or whatever means for making images perceptible to user 101. Information about one or both of the person's eyes, such as eye rotation, blinking, pupil diameter, head orientation, and/or related data, is captured by sensor system 103. The user 101 is provided optional input facility 104, such as including mechanical inputs like buttons, levers, touch surfaces, video capture of gestures, biofeedback sensors, voluntary eye tracking input, and so forth. It will be appreciated that any or all of these devices or systems may be used in whatever multiplicity and be arranged in whatever manner spatially and/or temporally.

Controller, local equipment, or thin client 105 interfaces to display 102, sensor 103 and input means 104. It may in some examples be a substantially general purpose computing platform or other device that is substantially under the control of user 101 or more generally not offer protection for the video content and user input that it receives. In other examples it may be protected by tamper resistance, such as tamper indicating and/or tamper responding and/or barriers and/or complex structure, so that it offers some degree of protection of the data that it may have access to. Content supply 106 is any system means or method for providing video images to controller 105, whether it is local to the viewer 101 or remote from viewer 101 or comprised of a combination of whatever combination of equipment and procedures at whatever distances from user 101.

In operation, in a simplified example for concreteness and clarity in exposition as will be appreciated, controller 105 provides content to viewer 101 through display 102 responsive to inputs from sensors 103 and input means 104. Supply 106, responsive to input from controller 105, provides content to controller 105. It is believed that supply 106 is able to provide video in a way that substantially increases what is required to re-create or copy the video by those with access to controller 105 and/or sensor 103, display 102 and/or input 104, whether that access includes tapping of information and/or active injection of or alteration of information. In one exemplary non-limiting aspect, video information may be customized by supply 106 for a particular viewing instance so that it omits information that is not likely to be substantially perceived by viewer 101 but that is substantially likely to be perceived as missing by at least some other viewers. In another non-limiting exemplary aspect, video information may be customized by supply 106 for a particular viewing instance so that it contains modified, selected or injected information that is likely to be perceived as non-disruptive or unnoticeable by viewer 101 in the particular instance but that would be perceived as substantially noticeable and/or disruptive by some other viewers, including when parts of more than one such video information are combined in an effort to remove customization related to their respective original viewing instances. The combination of customization techniques, including omission of information and/or modified and/or selected and/or injected information will be called "differentiated" herein. Audio and/or tactile and/or olfactory and/or other sensory inputs for user 101 are also optionally provided by supply 106 through controller 105 to user 101 through means not shown for clarity.

As will be appreciated, for interactive content rendered from digital models, a model for a foveal region may be provide greater detail and have greater computational requirements than a model for a peripheral view, providing both economy in rendering and protection against copying.

Figure 2:
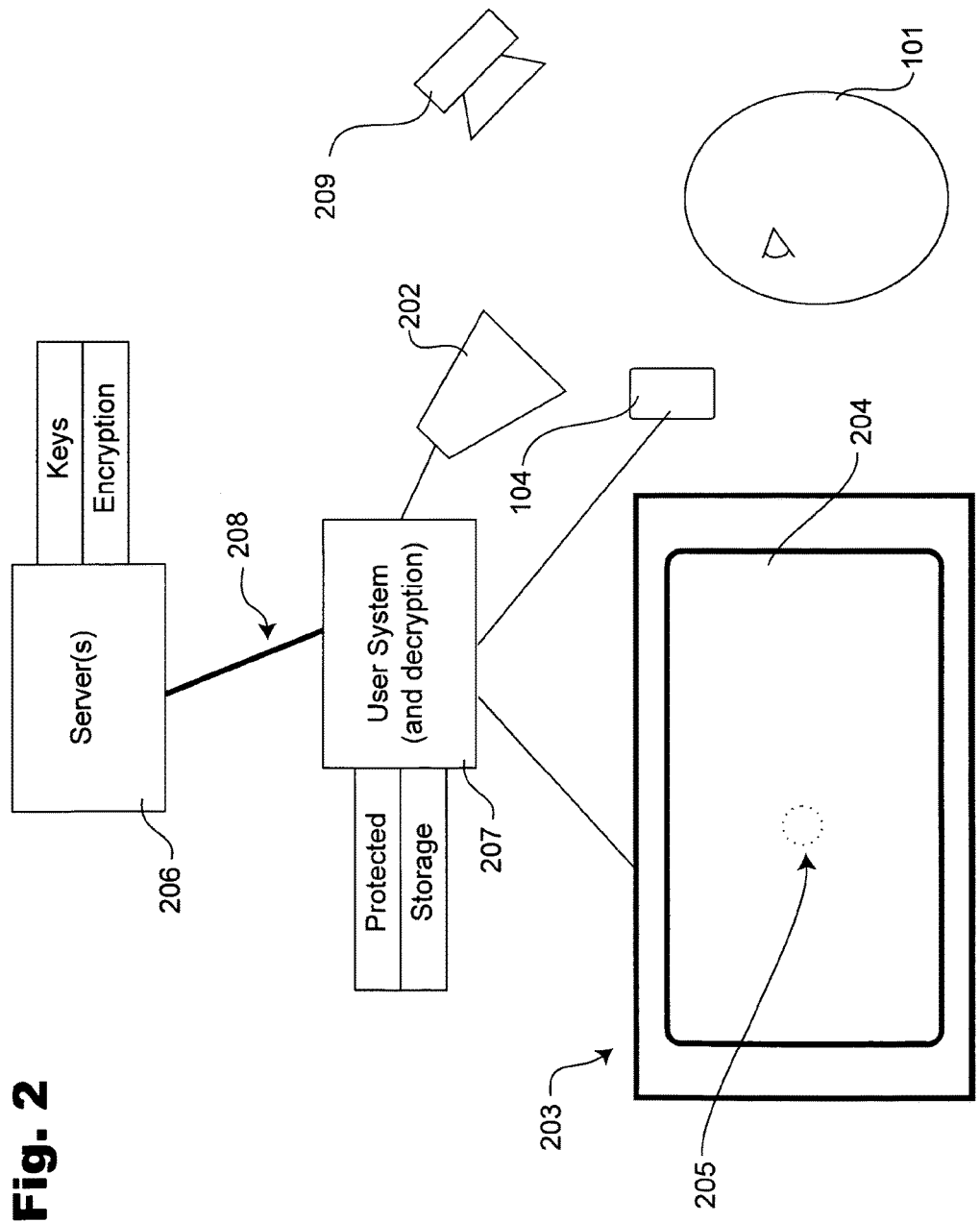
FIG. 2 is a combination block, system, schematic and plan diagram for a single user and server system with display for an exemplary embodiment in accordance with the teachings of the present invention.

Turning to FIG. 2, a combination block, system, schematic and plan diagram for a single user and server system with display is shown for an exemplary embodiment in accordance with the teachings of the present invention. As will be appreciated, the configuration includes known prior art structures, such as user 101 and cooperating eye tracker 202, a display 203 with a peripheral image 204 and foveal inset 205, and one or more servers 206 that sends data to the local "user" system 207 over a channel 208. Audio transducer means 209, such as loudspeakers, headphones, ear buds, or the like are shown for playing the audio aspect of the video, which is included implicitly in much of the disclosure here as it is little impacted apart from the "time shifting" mentioned. However, other structure and steps are shown and anticipated as well. For instance, the server 206 stores keys and it encrypts data selectively with keys before supplying the data to the user systems 207 and the user system 207 stores the encrypted data and the user system has decryption capability and selectively decrypts those items of data for which keys have been received responsive to requests for insets that it makes to the server over the channel 208. In some examples, substantial data that anticipates contingencies that do not occur ends up being sent by the server 206 but for which keys are not released. In some examples the protected structure shown as part of the user system 207 receives the keys from the server 206 and handles them according to instructions and procedures (which optionally may be updated) from server 206. The protected structure may supply the keys to unprotected structure for decryption of stored images, including optionally peripheral region images 204. The protected structure optionally provides privacy protection by not revealing certain types of data to server 206, such as retina patterns, viewing details, and payment and authorization functions. In other exemplary embodiments, for example, user equipment 207 projects directly into the eye, is portable, is a very light-weight client, is integrated with other platforms, is integrated with the display, is integrated with the eye-tracker 202, is a general purpose computer, is a network appliance, is an entertainment appliance, is worn by users, and/or is hidden within user regalia. In the example application of a video game or the like, a user control 104 shown provides for various input from user 101 during a session and typically user system 207 is responsive to such input, such as by changing the model displayed or changing between pre-rendered images supplied, and/or combinations of these optionally responsive to procedures for this supplied and as mentioned.

Figure 3:
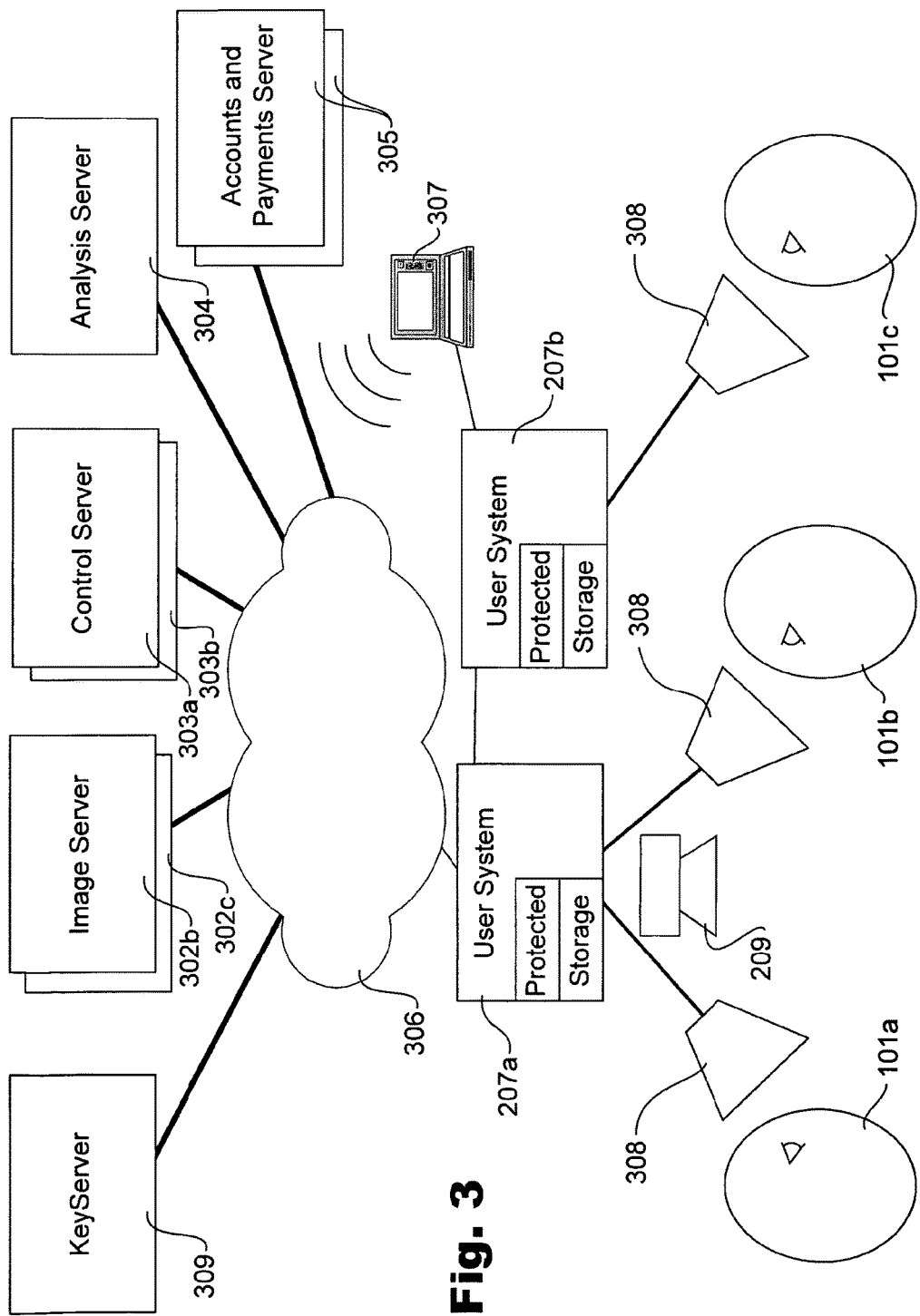
FIG. 3 is a combination block, system, schematic and plan diagram for a multiple user and server system for an exemplary embodiment in accordance with the teachings of the present invention.

Turning now to FIG. 3, a combination block, system, schematic and plan diagram for a multiple user and server system is shown for an exemplary embodiment in accordance with the teachings of the present invention. The multiplicity of some of the elements already described, including by reference to FIG. 2, are illustrated. In particular, an Internet type of communication structure 306, such as based on packet switching, is shown connecting various service components represented by one or more computer resources termed servers for clarity. The per-user structure is similar to that already described with reference to FIG. 2 for a single user. One aspect illustrated specifically is multiple viewers 101a-c, such as in a theater or other space sharing common audio. It is anticipated that they can also share common peripheral video display means 203 (not shown here for clarity) while having individual foveal displays 308, such as by the so-called "heads up" partly-silvered mirror approach, which incorporate eye observation generally and eye tracking as a particular example. Coupling of user equipment 207a-b, sometimes called "peer to peer" or just a home network is also shown, as well as wireless networking and portable devices 307. As mentioned, to improve latency and reliability, to increase the collusion size needed, to increase the number of protected devices that would need to be compromised, and for economy in transmission, copies of some insets may exist locally on other machines and a machine wishing to render them would be instructed, such as by the control server instance, of where and how to obtain them. A known technique applicable here is that such peers or various levels of servers or local data centers supply linear combinations of encrypted insets, allowing for robust distribution in a less coordinated manner.

An image server(s) 302 optionally stores pre-rendered backgrounds and insets and/or computes them on demand from models or data stored. It will be appreciated that multiple sets of image servers (e.g. 302b-c) are anticipated, some examples of which are shown, each optionally comprising multiple servers but each preferably under control substantially of the owner or custodian of the content. This allows that entity to ensure that only the insets requested are rendered/supplied, and that this is only done with the corresponding agreement/accounting and encryption called for. Control server 303 is intended to manage a central function of key management to the various user systems 101a-c and protected components in a substantially centralized manner so as to provide interoperability for the several content supplying entities 302a-c already described. A kind of surveillance system or analysis server 304 to look for fraud and patterns that may reveal misuse is shown also as a global function. As another example type of server, any of which can be combined or split as will be appreciated, accounts and payments server(s) 305 handle optional payments and authorizations for access to video content. A further example is key server 309 that supplies cryptographic key material, such as for decrypting content parts by user systems, as will be described also in more detail later.

Some example kinds of diversification of images/video have already been mentioned, such as perspective, cropping, alignment, color, temporal, focus distance, depth of field, and blind spot. Perspective is a mapping that includes the choice of projection and point of view. If the video is 3D, the viewer's virtual position in effect can change as can the degree of fish eye or other projection of the view, for example. Even when viewing is not 3D, such as a plain eye tracker screen, as are commercially available from Tobii, in Stockholm Sweden, the underlying images can be re-rendered with different perspectives, particularly if a 3D model is known or re-created. Flat images are optionally "projected," such as by scaling, cropping, and other transformations, to create one or more diversification parameters. The whole image can be aligned differently by shifting in the cropping window and the shape of the inset varied. The general color balance or level or even coloration of various objects or features can be changed to create diversification along such parameters. Where the focal plane is and the depth of field are known parameters in photography, and each can be varied to create different images. Another type of diversification is using a piece of video in some versions that is not included in other versions: piecing together in such cases is believed to mean getting enough pieces from at least one version. Time can be sped up or slowed down, with known techniques applied to make such changes tolerable in audio, such as removing samples.

In another aspect, matching the information revealed to what is needed can reduce its utility to those who would seek to make illicit copies. The optic nerve creates a blind spot on the retina; no image need be supplied for this spot. Rather than a diversification, blanking this location punches a hole in a substantially high resolution part of the image and creates an obstacle to piecing together of images. Other shape and graded distribution of the foveated part and the related medium density parts and the color sensitivity mean that piecing together is more difficult than the use of a rectangular foveal inset as are believed primarily used in the art. As another example, some persons have less than perfect vision, whether it be color blindness of various types or lack of acuity in one or both eyes. If these limitations are known or ascertained, then they allow further information to be omitted from some images released.

Figure 4A:
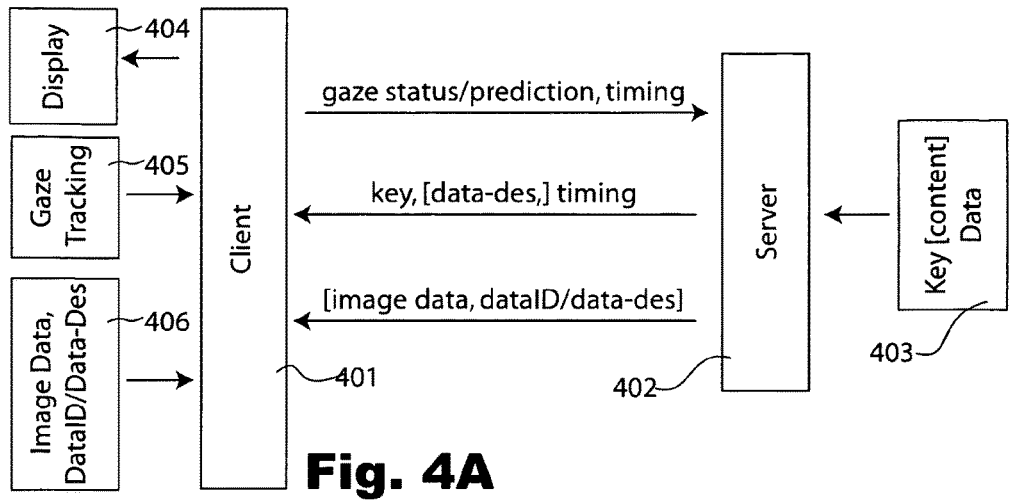
FIG. 4 is a combination functional, block, schematic and cryptographic protocol diagram for exemplary protected multi-resolution video data system embodiments in accordance with the teachings of the present invention.
Figure 4B:
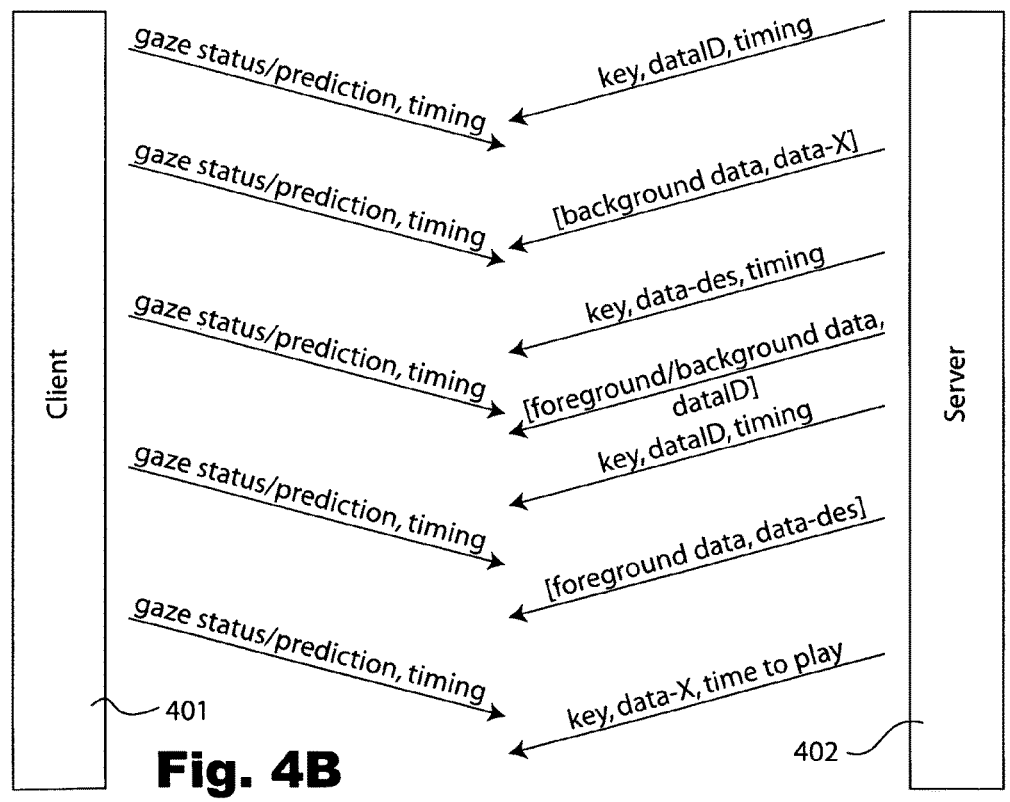

Turning now to FIG. 4, a combination functional, block, schematic and cryptographic protocol diagram is shown for exemplary protected multi-resolution video data system embodiments in accordance with the teachings of the present invention. A more general view is provided in FIG. 4A and a more detailed view of an example of data sequencing is provided in FIG. 4B. Communication between two parts of the system, the client and server, are shown; additionally, FIG. 4A shows cooperation between each of the two parts and other exemplary parts of the system.

Referring more specifically to FIG. 4A now, the client side 401 for example is hardware and/or software systems used by the viewer in the process of viewing the video content. The server side 402 is shown taking input from a data store 403 that secures keys and optionally video content related data. In some examples, this includes full-resolution clips that comprise the video and/or redundant clips and/or underlying models of the data to facilitate diversification as already explained. The client side is shown supplying video and/or audio and/or stereo and/or 3d information to the "display" means 404 or system that provides input to the user or users of the system. The client side is also shown taking input from a gaze tracking means/subsystem 405. The client is further shown also optionally using a local store 406 of image data. Such data is optionally labeled by a "data ID" and/or a so-called "data-des," short for data description. It will be appreciated that a description and an ID can be similar and/or one can be computed or limited by the other. In one direction, knowing the location on the screen and the time during a segment that a video portion should play in some examples identifies the data; in other examples, there are plural such items, however, each user may only have one. In another direction, an identifier for a video portion optionally includes an indication of, or allows checking of, directly or indirectly through other sources, the place in the video stream such content fits. The client is shown taking input from local image data and dataID and/or description data as an option. One use of such an option is where such data is recorded on a data transport media or downloaded or supplied by a peering network to the user. Some such data optionally is not encrypted; however, some foveal data in the system is preferably not provided except on demand at least in decrypted form and may optionally be stored or locally available in encrypted form. In some examples the data is sent to the client, such as by the server, and stored locally or cached for later use, and this is shown by the arrow in the opposite direction.

A first message type is shown transmitted by the client and received by the server and comprising two sorts of data, at least implicitly. The first sort of data is gaze status and/or prediction data, which will also here be called "gaze characterization data." For example, such data relates to where the user or users of the system are looking at the displayed data and/or historically where such gaze has been as a function of time, and/or a characterization of the direction or location to which such a gaze is expected to change to. So-called vergence information, related to the relative angle between the eyes, is preferably included in some examples as part of the gaze information and in a similar way. The second sort of data relates to time. For example, it indicates the time, such as absolute or relative, at which the gaze data was collected and/or sent and/or the interval over which it relates historically, and/or when a fixation is predicted to occur and/or how urgently the message needs to be delivered and/or processed.

A second message type is shown transmitted by the server and received by the client and comprising two sorts of data, at least implicitly, and an optional sort of data. The first sort of data relates to cryptographic keys and the like. Such data is preferably at least not readily guessable by the receiver and thereby provides the receiver additional ability to decrypt data that has been encrypted in a corresponding way, such as by the sender. The second sort of data is optional and shown as the data description, as already described; it characterizes the data for which the key(s) should assist in the decryption process and/or what data should be included along with such decrypted data. Again the other exemplary sort of data relates to time. For example, it indicates the time or relative time at which the key is to be used.

A third message type is optional and is shown transmitted by the server and received by the client and comprising two sorts of data. Such data optionally is already present, in whole or in part, at the client side as already described. The first sort of data relates to image data or models or assets or components or the like. Such data is preferably encrypted when it is sent in advance of when it will be used and when it is not generally known. The second sort of data is optional and shown as the data description, as already described; it characterizes the data, such as the keys that should be used to decrypt the data and/or what data should be included along with such decrypted data and/or when the data should be displayed and/or where the data should be displayed.

Referring now to FIG. 4B, a somewhat arbitrary example with some specific data is included for concreteness and to aid understanding as will be appreciated but without any limitation whatsoever. Client side 401 and server side 402 are again shown. Actual arbitrary message examples between them are shown. The messages are shown as diagonal lines sloping down as they travel away from the sender, so as to convey the latency in the channel between the two entities. It will be understood that the two processes, that of the client and that of the server, can be considered as sending streams of data and receiving streams from the respective counterparty, as is illustrated explicitly here.

The arbitrary concrete example stream from the client includes packets or messages that give updates on gaze information with implicit or explicit timing. These are shown at substantially unpredictable intervals, such as when a so-called ballistic saccade trajectory is detected, when its end point can be calculated, and/or when it actually ends. The timing component indicates when the packet was sent, optionally how urgent it is, and what period of time it relates to.

The arbitrary concrete example stream from the server includes several sorts of messages. A first message shown provides, in a first component, a key for decrypting some video content identified in a second component, and provides the particular relative interval during the video during which the content is to be played. A second message provides background data, sometimes referred to as peripheral images, and associates an identifier with the particular data. Such data in some embodiments is provided in the clear as it is background data, in other embodiments it is provided in encrypted form and in still other examples it is not sent but provided locally. The third datagram provides a key, data description of the particular data to be decrypted with the key, and the time during which that segment should be included in the video. The fourth message, an optional one as the data may be known locally, includes foreground and/or background information, identification of the data, and the data is optionally in encrypted form or not as already described. The fifth example shows keys and identification of the data to be decrypted and when in the video to include the data. The sixth message is an optional one like the fourth message, as the data may be available locally. It provides foreground data and a data description of where such data is to be included in the stream. The particular timing is included along with the key or is otherwise implicit. The seventh message illustrates a key, the identifier of the data, which was from the second message, and the time to play the data.

Figure 5:
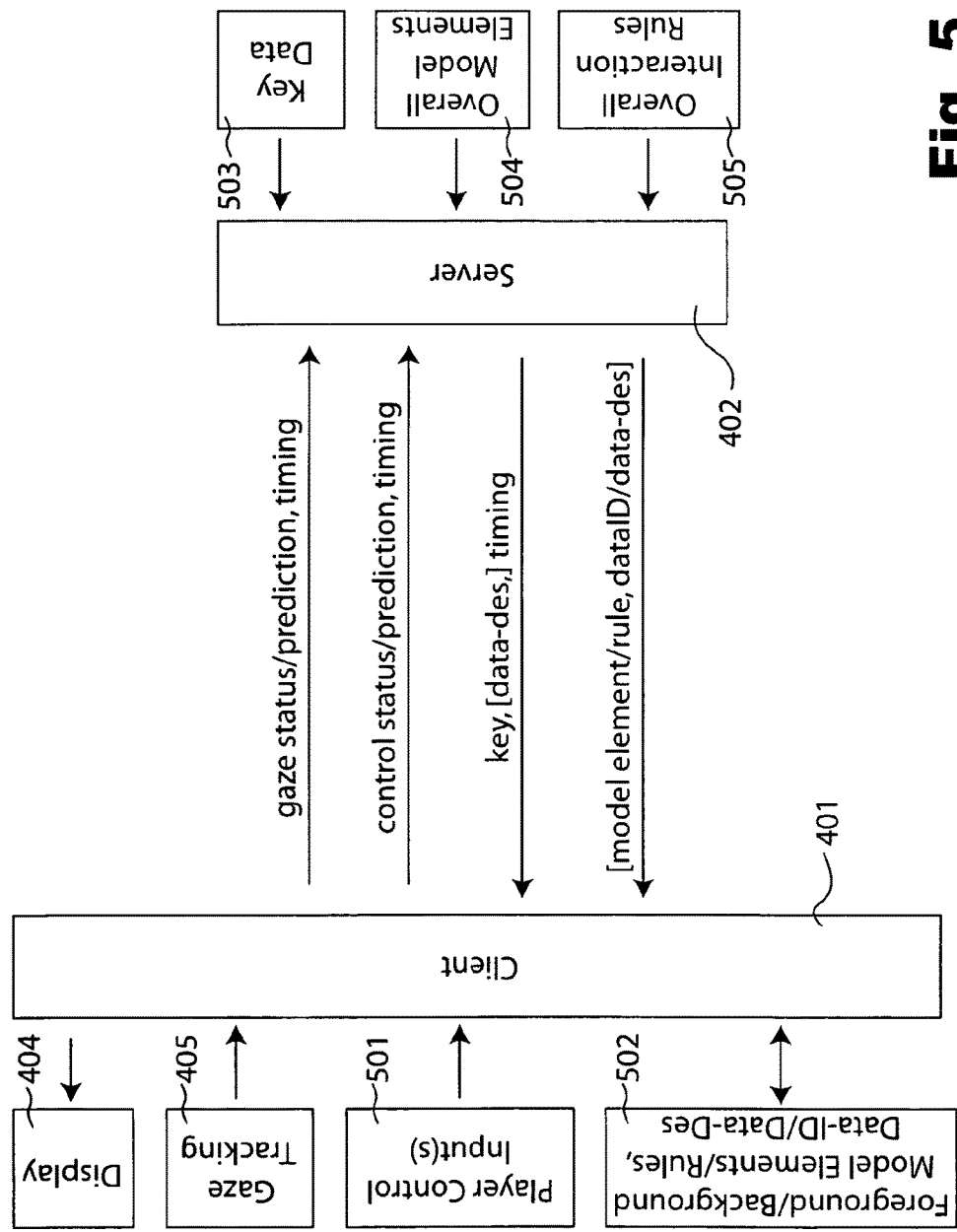
FIG. 5 is a combination functional, block, schematic and cryptographic protocol diagram for exemplary protected multi-resolution interactive video data system embodiments in accordance with the teachings of the present invention.

Turning now to FIG. 5, a combination functional, block, schematic and cryptographic protocol diagram is shown for exemplary protected multi-resolution interactive video data system embodiments in accordance with the teachings of the present invention. Communication between two parts of the system, the client and server, are shown; additionally shown is cooperation between each of the two parts and other exemplary parts of the system.

Client side 401 is shown communicating with four subsystems. The display 404 output and gaze 405 tracking input to client side 401 are substantially as already described for these subsystems with reference to FIG. 4A. Additionally, shown are one or more player control inputs 501. In some examples, these are simply a typical computer pointing device, such as mouse/touchscreen/pad and/or keyboard, that users provide input with. In other examples it is a game controller. In still other examples, it is all manner of virtual reality cues from the user that are intended to affect the displayed data and/or state of play of the game/session. The image data and related data already described with reference to FIG. 4A is generalized as model elements and/or rules 502 that are, in the example, broken down into whether they apply to the foreground or the background. For each such element, or for relevant structures of such elements, identifiers and/or data descriptions are provided and stored.

Server side 402 is shown have three subsystems from which it can draw information. The first subsystem is key data secure store 503, such as is typical and which provides management and processing related to keys as is known. Server side 402 in the example has access through a second subsystem to the overall model for the game 504. This presumably includes such things as the various elements, shading, geometries, lighting, textures, and so for the known in the animated model art. Server side 402 also has access to overall interaction rules 505, through the third subsystem, that define how the model is to change based on the inputs from the user, other users in multi-player games, and random chance. It is believed that such overall model and rules are too costly to send in real time as needed and/or are preferred not to be released to the client because of issues related to proprietary information, cheating, and/or illicit copying.

A first message type related to gaze information is shown transmitted by the client and received by the server much as already described with reference to FIG. 4A. A second message type is similar, but related to input from the user control device and timing. This data is similarly status reporting, prediction based on local analysis, and characterization of trends. It relates to specific times, such as relative to the client interaction or real time. A third message type, also similar to that already described with reference to FIG. 4A, relates to keys supplied and data descriptions (including model and rule descriptions) that are optionally included, along with implicit and/or explicit timing information, such as when the data that can be decrypted with the key should be used. The fourth message type relates to the supply of model and rule elements and related data identifiers and descriptions. As with video, in some examples the model and even rules for the background or peripheral images and/or sound are substantially protected, if at all, by means outside the present system. Some such data is optionally encrypted and know already to the client subsystem and/or sent in encrypted form in the fourth message; such data is revealed when corresponding key material is revealed in the third message.

Figure 6:
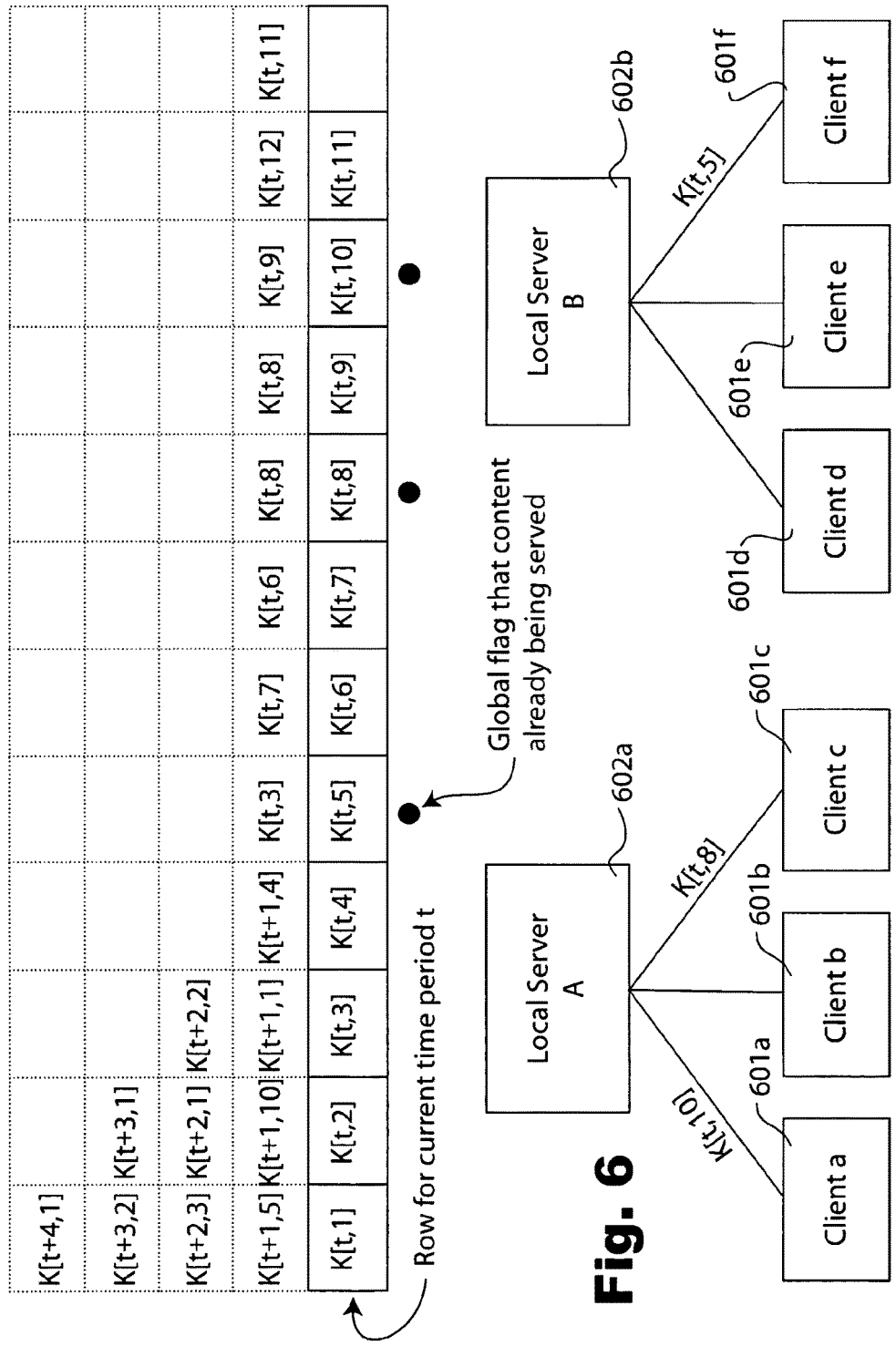
FIG. 6 is a combination functional, block, schematic and cryptographic protocol diagram for exemplary privacy and access protected system embodiment in accordance with the teachings of the present invention.

Turning now to FIG. 6, a combination functional, block, schematic and cryptographic protocol diagram is shown for exemplary privacy and access protected system embodiment in accordance with the teachings of the present invention. Clients 601a-f, whether in the context of video or more general interaction, preferably are supplied with keys and/or data expeditiously, to improve or maintain the user experience and also to reduce the level of extra data needed to accommodate contingencies before the relevant data can arrive. Accordingly, it will be understood that in some situations one or more local servers 602a-b that have relatively low latency connections and high-quality of service with various clients will advantageous. As will be appreciated, however, such local servers 602 are preferably unable to know at least some data related to client interactions because of privacy concerns. But the owners of content, for instance, want to be sure that they are paid for any authorization to view the content, which also allows the content to be sold by third parties.

According to the figure, local server "A" 602a has good channels with clients 601a-c. In particular, server 602a is shown communicating with client "a" 601a using a so-called public key shown as "K[t,10]" labeling the link; and with 602c using key "K[t,8]." Now it will be understood that preferably all the communication between the two will be encrypted end-to-end, such as using that key in the relevant known protocols, in order to limit what eavesdroppers can learn. The local server 602, however, also in effect authenticates the recipient of the content, and ensures that it goes to the correct recipient only, by using the public key of the client. Each such public key will be taken as an authorization of the content owner for the client to receive the content. The keys are from the row with time t shown in solid lines; future time periods will use subsequent rows, such as those with keys having subscripts t+1 next, and then t+2, and so on. Now server "B" 602b also serves up content using the public keys, but it is believed at least in some settings preferable that the content is only served to one place at one time; accordingly the servers are shown marking with the solid disc those columns that they are serving. It will be appreciated that the subscripts are not correlated to the users in a unique way and appear substantially permuted per row. This is believed to improve privacy. Moreover, when a user obtains the right to use particular content, a new entry is added; however, which one is new in a new row is hidden within that row. So by the device of refreshing to use a new row, the length of time a public key has been valid is believed no longer revealed and its relationship to any key that drops of the list in a later row is similarly hidden.

In some examples each of plural content owners supplies there own content local server 602 (or one is supplied by someone they trust to do so). For convenience these are preferably housed and managed by similar infrastructure per location, even though different content providers are included there. By controlling the devices that in effect issue the keys unlocking the data, the owner ensures that no full set of keys is released for a complete piece of content that is not diversified, or at least that if this is done that the pieces are spread far and wide and preferably some protected hardware is also included.

Figure 7:
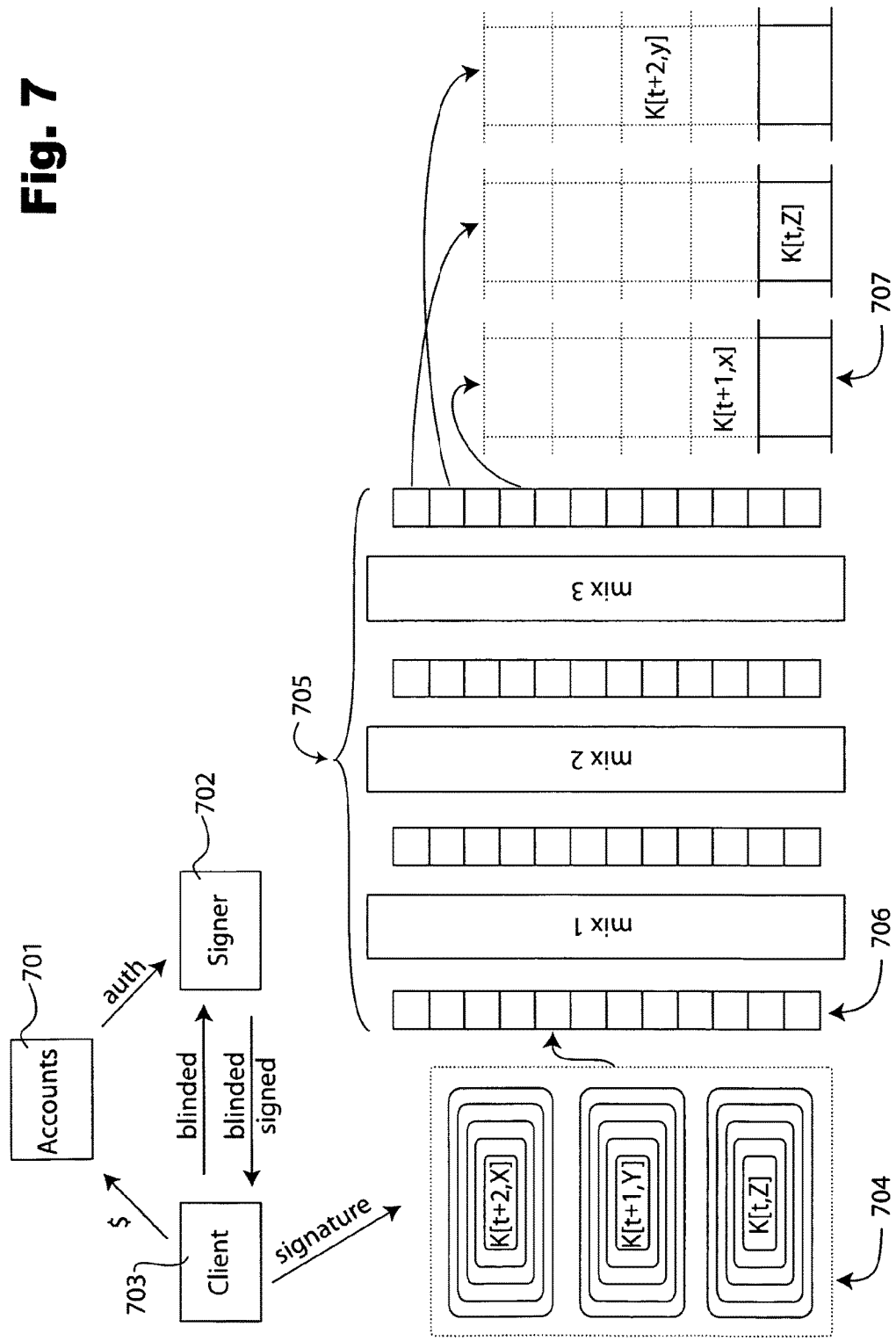
FIG. 7 is a combination functional, block, schematic and cryptographic protocol diagram for exemplary privacy protected authenticator system embodiment in accordance with the teachings of the present invention.

Turning now to FIG. 7, a combination functional, block, schematic and cryptographic protocol diagram is shown for exemplary privacy protected authenticator system embodiment in accordance with the teachings of the present invention. From a privacy perspective, any potential linking between user and the particular content they obtain and their viewing details is preferably severed. As mentioned, it may also be desirable to divide the various functions in the system, particularly if the content owner can verify that their interests are being protected. An example system is described here in which the owner maintains account information, but the payment function and the function of establishing the authenticators is separated from the content owner. Moreover, the particular example allows the client to choose the authenticators, not reveal them to the content owner in a way linkable to the account/payment from which they were obtained, and even influence the particular order in which they appear in each time period row already described with reference to FIG. 6. In the example, the owner can be the entity providing the "auth" message to the signer and/or the signer. The total number of valid rows of the table should equal that which the owner has authorized and the owner can verify this by checking the number of valid columns in the rows of the table.

In operation, the client supplies money and/or some other thing(s) to the accounts/payment function 701, who in turn provides the authorization message to signer 702. This party enters into a blind signature process with client 703, as indicated. The result is a signature that client 703 can unblind that authorizes input 704 to mix network 705, shown in the example with several nested layers of public key encryption over each ultimate table entry, as is known for registering digital pseudonyms. The mixes process each of the three inputs shown in a separate cascade, once the relevant time period is just about to take effect. Thus permuted batch 706 shown to the left of and as input to "mix 1" comprises so-called "onions" with identical value of t. The entries in the final table 707 for FIG. 6 are shown filled only for the particular use in this example, for clarity, and as will be seen there is one per row and each is in a substantially unpredictable column.

Turning now to FIG. 8, a combination block, system, schematic, plan, flow and timeline diagram for a single user and server system with display is shown for an exemplary temporary blindness aspect embodiment in accordance with the teachings of the present invention. For this aspect, which optionally is combined with other aspects, the system is shown in FIG. 8A and the corresponding flow and timeline in FIG. 8B. Some differences are shown as illustrative of examples other than those shown in FIG. 2, such as "onscreen" user controls 802. Instead of a full eye tracker functionality, eye watcher means 803 are shown, to indicate that for this aspect recognizing and predicting temporary blindness intervals for winks and saccades are of interest as part of this aspect, but the precise points of regards, optionally apart from gaze outside the field of view, may not be used in some examples. In one example, such features are detected and/or predicted by a camera and related computational structure.

Referring now to FIG. 8B, timing is indicated through an example timeline related to the aspect of FIG. 8A. In particular, the typical video is shown as viewing interval 805 and the indication interval 806 depicts the portion of the video during which a recognizable indication is incorporated. Accordingly, the video stream is served up to the viewer until it is detected that a blindness interval is imminent and then the indication interval, which incorporates the recognizable indication already mentioned, is included in the stream and/or by reference or code for local rendering. Once the indication has been included and/or the eye watcher or other means communicates that the viewing interval should start, it does.

Figure 9:
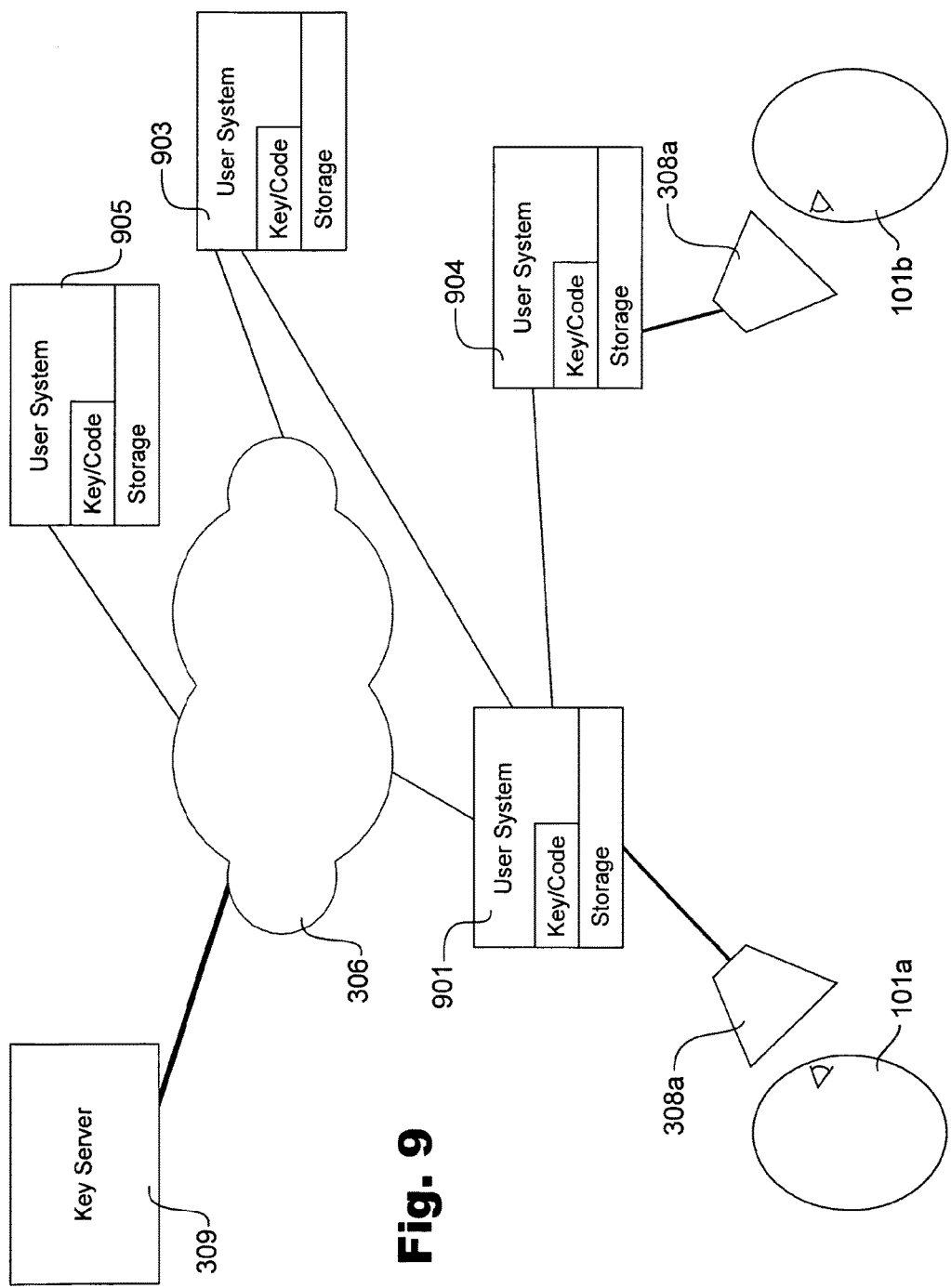
FIG. 9 is a combination block, system, schematic and plan diagram for a peer key management viewing system in an exemplary embodiment in accordance with the teachings of the present invention.

Turning now to FIG. 9, a combination block, system, schematic and plan diagram for a peer key management viewing system is shown in an exemplary embodiment in accordance with the teachings of the present invention.

A particular user 101a and his or her user system 308a, the "viewer user," will be assume to have a full but encrypted content version of a particular title on a portable memory device (not shown for clarity), such as a disc, or has downloaded it in advance and/or has a download in progress. Such content versions are preferably not all identical. For instance, portable memory devices are known to be created in volume more efficiently in a limited number of different forms and these forms would be distributed substantially randomly or so as to provide a suitable distribution of the different forms. As another example, when the images are distributed online, each is preferably formed uniquely, using whatever diversification and unique keys. Economy of production and management of versions generally, however, might tend towards re-use of some versions and/or parts being combined differently per version. In some examples the data that would have been served up to user systems in other embodiments described here are each encrypted separately under substantially different keys.

In a preferred example operation, when a key server 309 is to allow user system 101a to view particular content already substantially at that user system and/or on its way to that system, the key server provides keys enabling this to a set of other user systems 903, 904, and 905, for example, that are somehow effectively connected to user system 101a. During viewing user system 901 requests keys as needed from the other user systems, 903, 904, 905 in the example. In some examples, each other user system has copies of the needed keys and supplies them as requested; in other examples user systems get subsets of the keys. It will, however, be appreciated that requiring the user to contact more than one user system/player in order to obtain any key is preferable as this is believed to require an attacker to compromise more than one such device. In some examples all of a set of user systems would need to be contacted to get the parts of keys, such as group elements, that would then be combined, such as by a group operation, to form the needed key. In a preferred exemplary embodiment, however, the keys are divided by the well-known so-called "secret sharing" technique among the user systems so that typically most but not all such user systems are necessary and sufficient to provide keys allowing the viewing user to recover the key needed to decrypt the stored encrypted content.

The user systems contributing key material preferably do so according to some restrictions and also keep some records for provision to a server such as key server 309. In some examples the "firmware code" that induces this behavior in the user systems is fixed or updated only periodically. In a preferred embodiment, the keys or "secret shares" are downloaded to each user system server with software code or instructions that it is to use in handling the keys, requests, and reporting. Some aspects of user system operation, such as periodic broadcast of messages indicating their presence and other aspects of their status such as connectivity are preferably in updateable firmware.

During the viewing of the content the set members may be changed by the key server to reduce exposure. For instance, periodically through the viewing process keys anticipated as needed for a window forward in time are issues to one set. Later those for the next window are issues preferably to another set, and so forth. The reporting by user systems preferably influences the choice of such systems. Threat monitoring, as already described, is anticipated in such embodiments.

This embodiment also generally applies to interactive viewing, such as of games and whatever interactive content. In other related embodiments some or all of the user systems to which keys are provided are dedicated devices used for this purpose, such as might be referred to as super-nodes, and not actual user systems.

Figure 10:
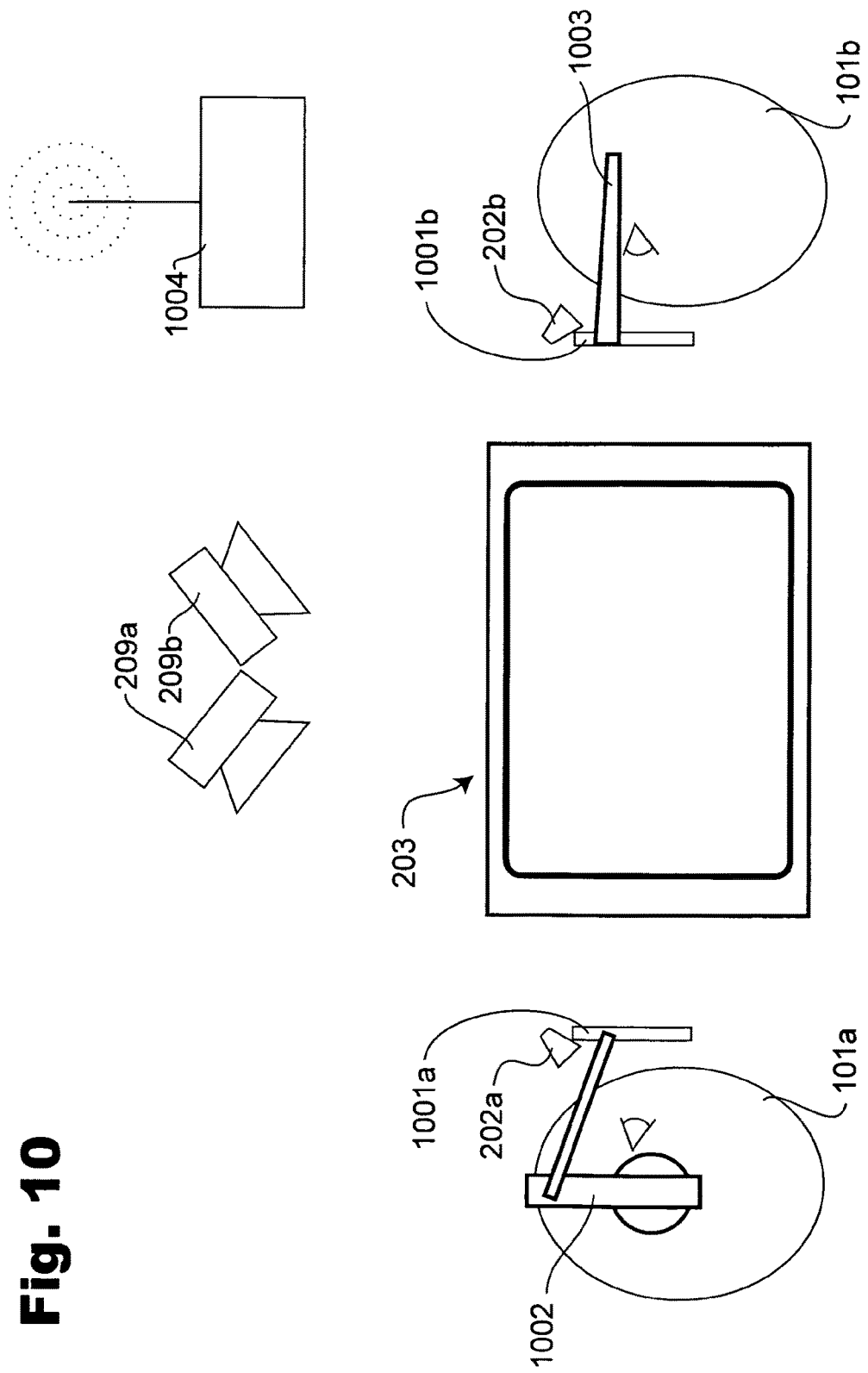
FIG. 10 is a combination block, system, schematic and plan diagram for a multi-viewer inset system in an exemplary embodiment in accordance with the teachings of the present invention.

Turning now to FIG. 10, a combination block, system, schematic and plan diagram for a multi-viewer inset system is shown in an exemplary embodiment in accordance with the teachings of the present invention. Two users or viewers are shown in the example, 101a and 101b, but it will readily be appreciated how any number of viewers can be accommodated. A single display 203 is shown as an example, though any number of displays can be accommodated, each preferably viewable by plural users or viewers 101. The example shows a common audio system 2089a-b, though audio is readily provided in whole or part by multiple sources, such as including individual devices per viewer, such as headphones 1002.

First viewer 101a is shown with a first blocker 1001a that blocks light from display 203 at some times and not at other times so that only insets intended for first viewer 101a are shown to first viewer 101a. Eye tracker 202a is shown, in the example, but without limitation, attached to blocker 1001a and the combination attached to what are shown for illustrative purposes substantially as headphones 1002. This attachment is in some examples detachable, such as by a clip, snap, Velcro, adhesive, or other mechanical attachment means. Tracker 202a determines the point of regard, preferably relative to display 203 or other displays as mentioned. In one example, this is by comparing the reflection on the eye of the image on screen 203 with the iris or other related eye structure. The point of regard is optionally measured relative to tracker 202a, such as by an IR source and glint, as are known, and the relative position of the tracker assembly to screen 203 determined by other means, such as gyroscope, IR transmitters, retro-reflective tags, radio frequency patterns or the like. In one exemplary embodiment, tracker 202a and blocker 1001a are in communication with one or more base stations 1004, whether attached to persons or objects, by radio or other electromagnetic energy transmissions. The second viewer 101b similarly is shown fitted with eye tracker 202b and blocker 1001b. In the example, these are illustrated as attached or integrated with eyeglasses 103 or similar structure worn by viewer 101*b*.

In operation, display 203 shows peripheral views with insets substantially illuminated to a level low enough that the inset images can be integrated by viewer 101*a-b* and perceived as filling in. In a preferred example, a complete image is shown to each viewer 101 including the inset and peripheral portions. In another example, all the inset locations are black in a view that all viewers are unblocked for and the individual inset images are shown and unblocked for the corresponding viewers. In still other examples, one or more viewers 101 are provided with inset projectors (not shown for clarity) that fill in the dark spots left in the displayed image and blockers are not used. A further variant has peripheral images supplied by viewer mounted systems and the insets are provided by the common display 203, with or without blocking.

All manner of variations, modifications, equivalents, substitutions, simplifications, extensions, and so forth can readily be conceived relative to the present inventions by those of ordinary skill in the art. Many examples have already been given above with reference to various aspects of the inventive concepts disclosed.

While these descriptions of the present invention have been given as examples, it will be appreciated by those of ordinary skill in the art that various modifications, alternate configurations and equivalents may be employed without departing from the spirit and scope of the present invention.

What is claimed is:

1. A method for displaying video content comprised of a series of images comprising:

a first supplying for render of at least an inset first portion of at least a one of the images in at least a substantially higher resolution than a second peripheral portion of the image;

wherein the inset first portion is a region of the second peripheral portion, the inset first portion selected to include a fixation of a person viewing the displayed video content;

a second supplying to at least a first viewer a first series of renders responsive to a series of fixations of the first viewer during a first displaying so that the first viewer can appreciate the series of renders as substantially naturally foveated and responsive to the fixations of the first viewer during the first displaying; and such that if said series of renders viewed by the first viewer were provided to a second viewer for a second displaying, the series of renders makes it substantially likely that the second viewer will perceive a degraded quality in the series of renders, because the second viewer likely has a substantially different sequence of fixations during the second displaying than the first viewer had during said first displaying.

2. The method of claim 1, wherein the second supplying step includes supplying video information from a protected remote location.

3. The method of claim 1, wherein the second supplying step includes supplying video information from a protected local device.

4. The method of claim 1, wherein the second supplying step includes by supplying video information from a plurality of at least temporally local devices.

5. The method of claim 1, wherein the second supplying step includes supplying encrypted content to at least one local protected device and later selectively supplying corresponding keys for decrypting the content to the at least one protected local device and the at least one protected local device using the keys to decrypt the content earlier supplied.

6. The method of claim 1, wherein the second supplying step includes not supplying to at least some entities in case of detection of some patterns of usage.

7. The method of claim 1, wherein the first viewer and second viewer are equipped with virtually reality goggles.

8. The method of claim 7, wherein the virtual reality goggles do not prevent viewing surroundings of the first and/or second viewer.

* * * * *